United States Patent
Durbin

(10) Patent No.: US 7,979,463 B2
(45) Date of Patent: Jul. 12, 2011

(54) DATABASE SYSTEM AND METHOD FOR ACCESS CONTROL AND WORKFLOW ROUTING

(75) Inventor: Gary Durbin, Oakland, CA (US)

(73) Assignee: SynchSource, Inc., Berkeley, CA (US)

( * ) Notice: Subject to any disclaimer, the term of this patent is extended or adjusted under 35 U.S.C. 154(b) by 594 days.

(21) Appl. No.: 11/516,685

(22) Filed: Sep. 5, 2006

(65) Prior Publication Data

US 2007/0067334 A1 Mar. 22, 2007

Related U.S. Application Data

(60) Provisional application No. 60/713,651, filed on Sep. 2, 2005.

(51) Int. Cl.
G06F 7/00 (2006.01)
G09G 5/00 (2006.01)

(52) U.S. Cl. .......................... 707/781; 715/738

(58) Field of Classification Search .............. 707/9, 100, 707/102, 1, 781; 726/2, 3, 4, 28; 345/738; 715/738, 733
See application file for complete search history.

(56) References Cited

U.S. PATENT DOCUMENTS

| | | | |
|---|---|---|---|
| 6,014,666 A | 1/2000 | Helland et al. | |
| 6,289,382 B1 | 9/2001 | Bowman-Amuah | |
| 6,633,878 B1 * | 10/2003 | Underwood | 707/100 |
| 6,754,666 B1 * | 6/2004 | Brookler et al. | 707/102 |
| 7,100,195 B1 * | 8/2006 | Underwood | 726/2 |
| 7,503,075 B2 * | 3/2009 | Sturms et al. | 726/28 |
| 7,562,065 B2 * | 7/2009 | Chavda | 707/1 |
| 2002/0161744 A1 * | 10/2002 | Gluckman | 707/1 |
| 2002/0196273 A1 * | 12/2002 | Krause | 345/738 |
| 2003/0172161 A1 | 9/2003 | Rymon | |

OTHER PUBLICATIONS

International Search Report and Written Opinion mailed Jun. 7, 2007, for PCT Application No. PCT/US06/34593 filed Sep. 5, 2006.

* cited by examiner

*Primary Examiner* — Hung T Vy
(74) *Attorney, Agent, or Firm* — Morrison & Foerster LLP

(57) ABSTRACT

A method for use with a database management system to produce a data structure encoded in computer readable memory that indicates a role associated with a transaction comprising: obtaining page context information that includes userid, subjectid, page name and a transaction identifier; providing a plurality of role views that associate userids and subjectids with role names; using the page name from the page context information to access a page definition relation that provides an association between the page name and at least one subject name; using the at least one subject name from the page definition relation to access a access a role view list that lists one or more of the role views; using the userid and the subjectid from the page context and at least one role view name from the role view list to access at least one role view that includes a matching userid and a matching subjectid; and producing a log roles structure that associates a role name from the at least one accessed role view and a transaction identifier from the page context.

8 Claims, 11 Drawing Sheets

DATABASE SYSTEM AND METHOD FOR ACCESS CONTROL AND WORKFLOW ROUTING

CROSS-REFERENCE TO RELATED APPLICATION

This patent application claims priority to commonly owned U.S. Provisional Patent Application Ser. No. 60/713,651, entitled ACCESS CONTROL AND WORKFLOW ROUTING BY REAL-TIME RELATIONSHIPS—A STRUCTURE AND PROCESS FOR ACCESS CONTROL AND WORKFLOW ROUTING IN ONLINE APPLICATIONS, filed Sep. 2, 2005, which is expressly incorporated in its entirety herein by this reference.

BACKGROUND OF THE INVENTION

1. Field of the Invention

The invention relates in general to computer-based systems that present information to users and allow users to change or propose changes to information, and more particularly, to determining user access to information and to determining workflow of information among multiple users.

2. Description of the Related Art

As computer-based applications have been deployed more generally than in back-office departments, access to applications is provided to from thousands to hundreds of thousands of users with applications that have hundreds or thousands of presentations, the management of who has access to what information has become a big problem. A common way to manage access is to use an Access Control List. An ACL typically consists of a table having many entries with User Id, PageName, and Privileges, for example. The User Id identifies the person who is using the application—the user. The PageName identifies a particular presentation of information—a Page of information. A Page ordinarily includes data from computer databases, decorations, and navigation information for access to related presentations. Privileges are codes or indicators that specify whether the user can update data or see some parts of the data. In some ACL implementations, the entries contain rules that provide additional restrictions. Such a rule might say that a user having access to enter payments is limited to payments less than some dollar amount or that a user having access to employee's compensation information is limited to the ten employee numbers of the people that report to that user, for instance. In an environment in which one hundred thousand users have possible access to fifty PageNames each, the number of entries in the ACL could be on the order of about five million. Maintenance of such lists is time consuming and prone to error.

One solution to the multiplicity of ACL entries is to group many PageNames into a role or group. However, many roles cannot be statically assigned. The Manager role is relative to the Employee being considered. A user might be the Manager of one Employee but not of another. Some ACL methods extend the list entries with key values so that the entry only applies to some entities in the database. This approach can make the maintenance problem much more difficult since the ACL entries must be updated for each change in reporting relationships.

A common way that access is provided to Pages is to have menus of hyperlinks that the user can click on to access another Page. This presents menus in the common format of the Internet. Although most modern applications are designed to operate on the Internet using hypertext markup language, the access schemes also operate on other platforms.

The problem of maintaining the ACLs has become serious enough that several systems have been developed to automatically update the ACLs and to examine the ACL to determine that they conform to the rules of the organization for allowing access. While these systems reduce clerical work in a dynamic environment where people are joining, leaving, and transferring from job-to-job or organization-to-organization, the ACL will frequently be out of date. The latency of this method can render some applications unreliable or even unusable. If a project manager had to wait several hours for access to be available to a new member of a project, the use of such a project control system might be impractical.

In the mid 1990s, an application for Manager Self Service was introduced by Seeker Software, Inc. that included a rules-based system for access control that dramatically reduced the need to maintain ACLs. This system executed rules embedded in the applications that examined the relationships described in a database to infer the access rights. The innovation of Seeker's methodology was to use the embedded rules to control the menus and hyperlinks. From a list of possible menu items or links, only those items to which the user has access are displayed. This mechanism was an improvement over the Access Control List approach, but changing the rules for access was cumbersome because the rules are embedded in the application.

Many applications require that more than one user participate in a transaction. One user may enter some information and then other users may need to be notified, be allowed to approve or disapprove the transaction, or to review and forward the transaction to other users. This type of process is known as a workflow. One of the problems in workflows is identifying the proper user to perform a particular action—e.g., approve a proposed transaction, review a proposed transaction, or receive a notice of a completed transaction. In simple workflow systems, specific users or users in specific positions typically are assigned roles in the workflow. In applications where thousands of users are entering transactions, such workflow systems have limited use. In many cases, a user is asked to identify the next user to route the transaction to because the system cannot figure that out. In other cases the roles are limited because maintaining routing lists is so labor intensive.

Seeker Software improved on the maintenance of routing lists by embedding rules in the application that inferred workflow roles from relationship information stored in the database. This approach allowed a broader reach for the application since things like a user's approval manager could be inferred by relationships in the database rather than having to be specified in advance for that user. It also allowed a broader range of roles to be practical. A user might have an Approval Manager, an HR Administrator, an Executive Reviewer, a Project Manager and several other workflow roles, for example. When thousands or hundreds of thousands of users are entering transactions that require approval or review, an inference mechanism is superior to a routing list approach.

While the prior Seeker mechanism improved the maintenance of workflow routing lists, but it has been somewhat fragile and cumbersome because the rules are embedded in code.

Thus, there has been a need for improvement in control of access to presentation pages in computer systems that serve information to large numbers of users. There also has been a need for improvement in workflow routing involving access to pages by multiple users in such computer systems. The present invention meets these needs.

SUMMARY OF THE INVENTION

In one aspect, an embodiment of the invention includes a database structure encoded in computer readable memory and methods that allow access rules to be externalized from applications and that allow the same rules to be used for both access control and workflow routing. In some embodiments, an access control process uses the database structure to control access to information pages in an interactive application. A workflow routing process uses the same data structure to control workflow routing. In some embodiments, the data structure comprises a reversible rule-based mechanism that allows it to participate in both processes. In another aspect, the rule-based mechanism may consider time-based data to provide access control and workflow routing that is based on past or future states of an underlying database.

DETAILED DESCRIPTION OF THE PREFERRED EMBODIMENTS

The following description is presented to enable any person skilled in the art to make and use a database structure encoded in computer readable memory and a system and methods to use the database structure to control access to information and to control workflow routing in a computer system. The description discloses the system and method in accordance with embodiments of the invention and in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

The Access Control Problem—Access Control by Real-Time Relationships

Access Control is the problem of identifying the valid "next" pages when a user is viewing a specific "current" page. The current page might have menus of hyperlinks, submit buttons, or embedded hyperlinks that cause an application system to make a transition from the current page to one of many possible next pages. Which next pages a user is allowed to have access to and therefore, should be shown an enabled link of some kind is the problem Access Control addresses.

Figure 1A:
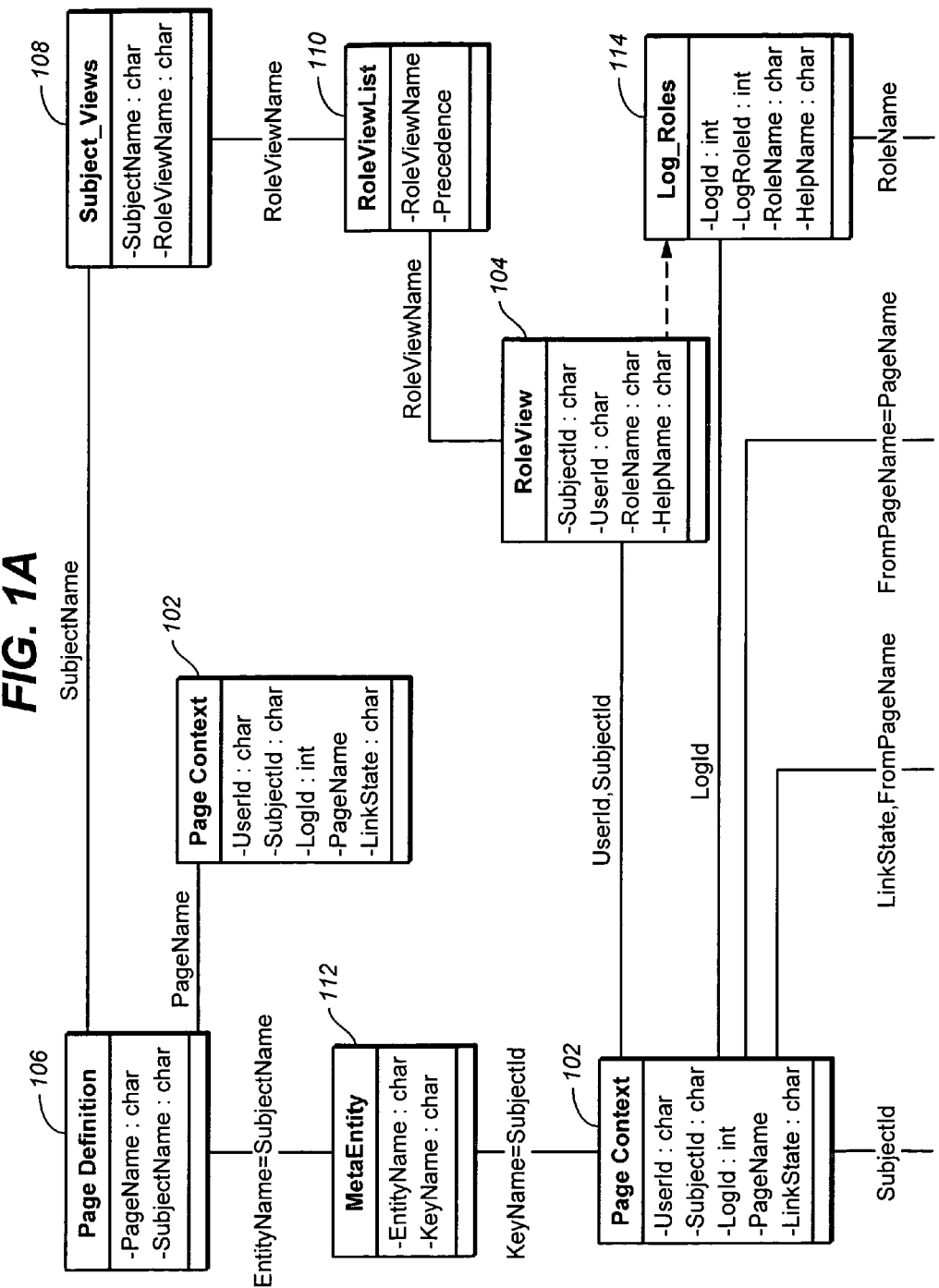
FIG. 1 is an illustrative drawing of processes to develop a Log_Roles table to develop a (next) PageNameList and to develop (next) UseridList in accordance with some embodiments of the invention.
Figures 1, 1B:
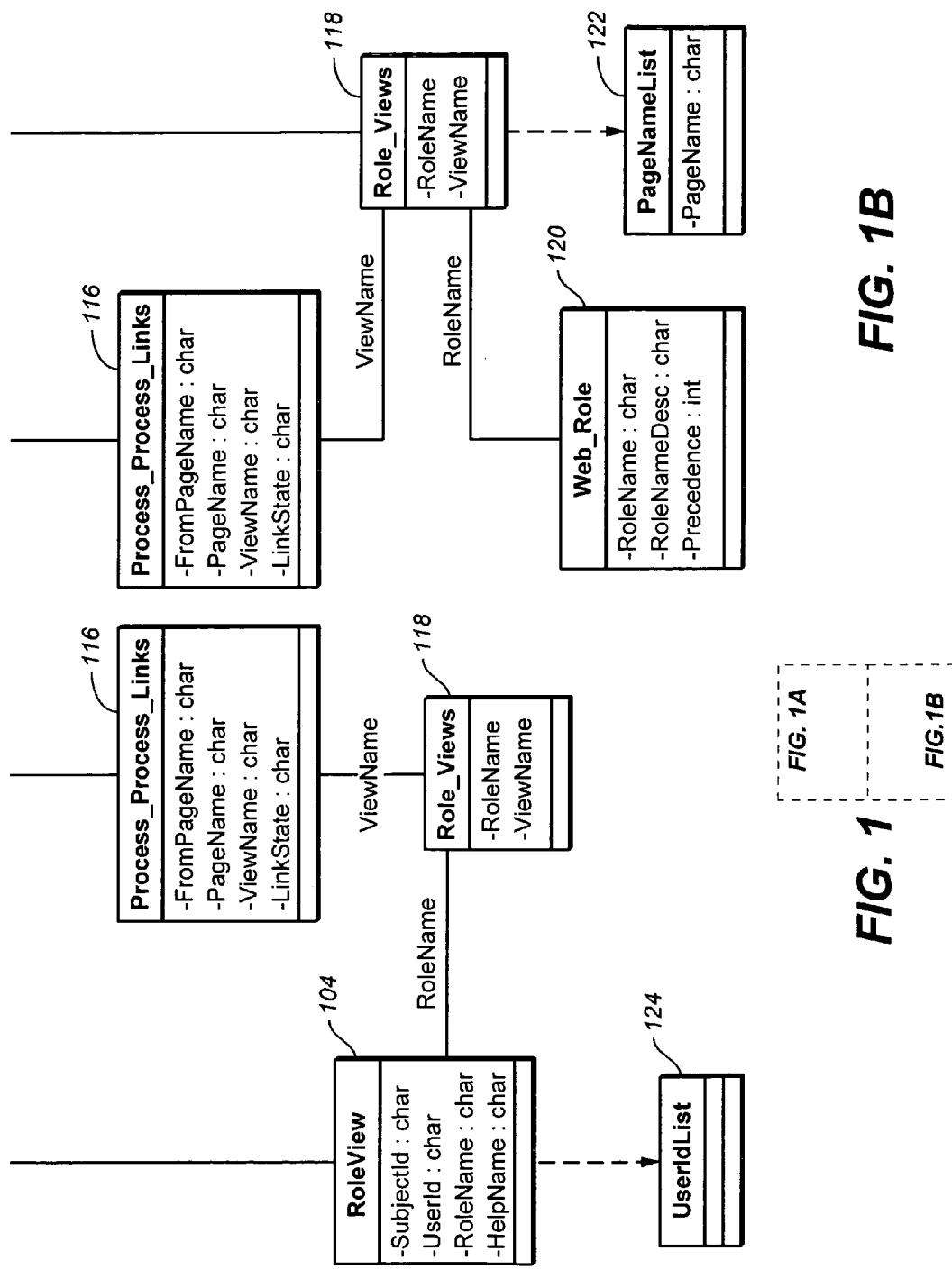

FIG. 1 is an illustrative drawing of a computer program process to develop a Log_Roles table to develop a (next) PageNameList and to develop (next) UseridList in accordance with some embodiments of the invention. A Page Context 102 includes userid, subjectid, PageName and a transaction identifier. A plurality of RoleViews 104 (only one shown) associate userids and subjectids with RoleNames. A PageName from the page context 102 is used to access a Page Definition relation 106 that provides an association between the PageName and at least one Subject Name. The at least one Subject Name from the Page Definition relation is used to access a Subject_Views table 108 that provides associations between Subject Name and one or more RoleViewNames. The RoleViewName from the Subject Views table are used to access a RoleViewList 110 that lists one or more of the RoleViewNames and associated precedence. A Meta Entity 112 is uses a keyname to provide an association between Subject Name in the Page Definition table 106 and a subjectid in the Page Context 102. A userid and subjectid from the Page Context 102 and a RoleName from the RoleViewList are used to access at least one RoleView 104. A Log_Roles table 114 is produced that associates a RoleName from the at least one accessed RoleView 104 and a transaction identifier from the Page Context 102.

A Process_Process_Links 116 table includes a from page name, a page name, a view name and a LinkState. A Role_Views table 118 provides associations between RoleNames and ViewNames. A Web_Role table 120 includes role-defining information and information concerning precedence among roles. A transaction identifier in the Log_Roles table 114 is used to access an instance of the Page Context 102 that is associated with the transaction identifier. A PageName from the accessed Page Context 102 instance is matched to a from page name of the Process_Process_Links table 116. A RoleName from the Log_Roles table 114 and a ViewName from the Process_Process_Links table and a RoleName from the Web_Roles table 120 are used by the Role_Views table to identify at leas one (next) page 122.

A PageName and a LinkState from an instance of the Page Context 102 is matched to a FromPageName and a LinkState of a Process_Process_Link table 116. A ViewName from the Process_Process_Link table 116 is used to access one or more RoleNames from an instance of the RoleViews table 118. A subjectid from the Page Context 102 and the one or more accessed RoleNames from the Role_Views table 118 are used to access at least one (next) userid from one or more Role-Views 104.

Additional details of the overall process illustrated with reference to FIG. 1 are provided below with reference to FIGS. 2-19.

Generating RoleNames

Figure 2:
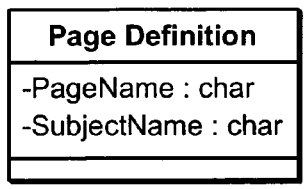
FIG. 2 is an illustrative drawing of a Page Definition table encoded in computer readable memory in accordance with some embodiments of the invention.

FIG. 2 is an illustrative drawing of a Page Definition table encoded in computer readable memory in accordance with some embodiments of the invention. The illustrated Page Definition table includes a PageName and one or more Subject Names. Each page of an application can be associated with one or more Subjects identified by a SubjectName. A SubjectName identifies content of an application that can be controlled as a unit. Typically Subjects relate to database entities such as Person, Project, Organization, Company, Customer, Vendor and so on. However a Subject could refer to a virtual aspect such as Staff Plan, or Financial Projection. While the mechanism provides for more than one Subject-Name for each Page, the preferred embodiment provides for only one per Page. Alternatively, Page may be associated with no SubjectName.

SubjectName also serves as a key to a Subject_Views table shown in FIG. 1 and provides the link between a Page Definition and the Subject_Views table which enumerates RoleViewNames for a particular Page Definition.

Figure 3:
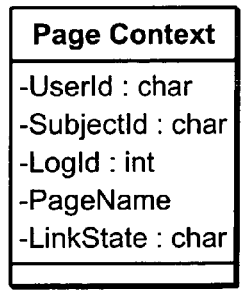
FIG. 3 is an illustrative drawing of a PageContext table encoded in computer readable memory in accordance with some embodiments of the invention.

FIG. 3 is an illustrative drawing of a PageContext table encoded in computer readable memory in accordance with some embodiments of the invention. In information processing systems, when a Page is rendered by a processing program, the processing program ordinarily has a context. A Page Context consists of information about the data being rendered such as database tables and database keys, for example. This example of a Page Context shows the variables that typically are known to processing programs in an interactive computer processing system. The variables shown in the illustrative PageContext table may be passed to a table through any of several mechanisms. In some embodiments, variables are passed as hyperlink variables, from parameters, or in XML tags. In addition to the variables used for this process, a system may provide other variables to control other processes. The specific values of the context are selected from the set of available variables. UserId is an identifier for the user who is using a particular instance of a Page processing program. SubjectId is a database key (or keys) associated with the content of a rendered Page. As an example, the SubjectName might be 'Person' and the SubjectId '123'. The purpose of mapping all database entities and their associated keys into the terms SubjectName and SubjectId is to provide a general mechanism for providing role-based access for a wide variety of subjects. With this mapping the underlying mechanism does not need to be specific to a subject even though the rules governing access may be quite different from one subject to another. In general, an access control scheme should be able to control the specific content that a user has access to. The SubjectName identifies the type of content, e.g. a Person, and the SubjectId identifies a specific person, e.g. '123'. This portion of the context is general, that is, we could say that the user represented by the UserId has access to some data about Person 123. Below (e.g., FIG. 13) the system will determine more specifically what specific content the user has access to. LogId is an identifier of the log of activities in the interactive computer processing system. The LogId is a unique id associated with a transaction—and instance of a page and context. It is used in the process to group together the RoleNames generated by the RoleView. The LogId is used so that the output from the first phase can be uniquely identified for use in the second phase. PageName is a key value that identifies the Page and page processor. Such an identifier is common in interactive systems. Some common examples of this are URL, transaction id, file name, and page id. LinkState is a variable generated by a Page processor and represents the state of a transaction or workflow at the end of processing. It is used in the workflow routing process.

Figure 4:
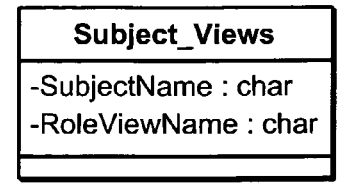
FIG. 4 is an illustrative drawing of a Subject_Views table encoded in a computer readable medium in accordance with some embodiments of the invention.

FIG. 4 is an illustrative drawing of a Subject_Views table encoded in a computer readable medium in accordance with some embodiments of the invention. The illustrative Subject_Views table is a data store that associates SubjectNames with Role Views. RoleViews are views defined in a database manager. The Subject_Views table provides the name of one or more RoleViews that define the roles for a Subject.

The following are illustrative examples of some related SubjectName-RoleViewName pairings:

| SubjectName | RoleViewName |
| --- | --- |
| Person | MgrandExec |
| Person | DirectMgrSrMgr |
| Person | ProposedMgrs |
| Person | SelfandAdmin |

The MgrandExec might contain SQL (rules) for Mgr and Exec roles. The DirectMgrSrMgr might contain SQL (rules) for DMgr and SDMgr which might require unions of several selects. ProposedMgr might contain SQL (rules) for proposed DMgr and proposed SDMgr. SelfandAdmin might contain SQL (rules) for Self and various administrative roles.

Figure 5:
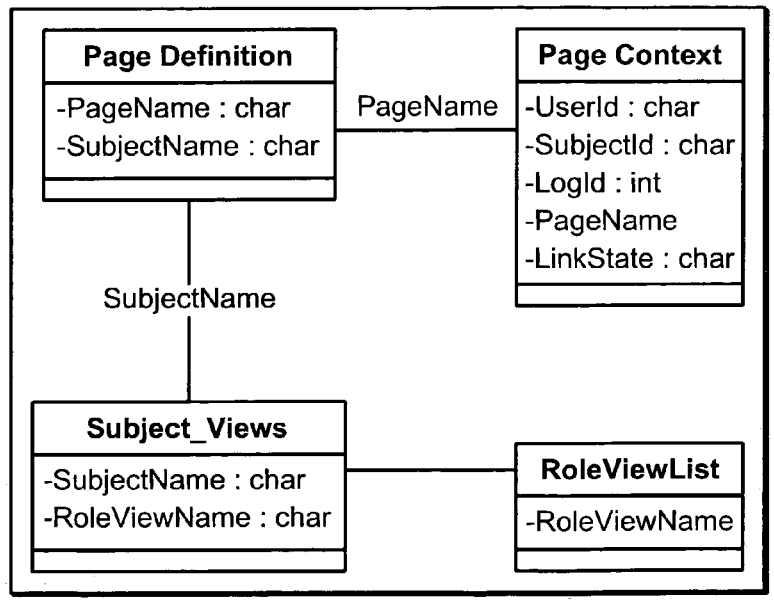
FIG. 5 is an illustrative drawing of a process in accordance with some embodiments to determine a RoleViewList from a Page Context.

FIG. 5 is an illustrative drawing of a computer program process in accordance with some embodiments to determine a RoleViewList from a Page Context. Basically, the process involves, using the PageName from a Page Context to access a Page Definition table. The SubjectName in the PageDefinition table then allows rows of Subject_Views table to be retrieved, that comprise RoleViewNames in a RoleViewList table. More particularly, in the process of FIG. 5 the PageName is a key to the PageDefinition relation, and that SubjectName is a key to the Subject_Views relation. The PageName from a PageContext relation is used to identify a PageDefinition relation. A SubjectName from the PageDefinition relation is used to access a Subject_Views relation in order to produce a RoleViewList. Thus, by associating the Subject_Views table with the Page Definition by using SubjectName, a list of Role Views is built.

Many modern database managers such as Oracle and PostgreSQL provide for the storage of views according to a common standard for SQL. A view corresponds to and often is referred to as equivalent to a small database program know as a query that accesses database tables and applies logical operators and selections.

Figure 6:
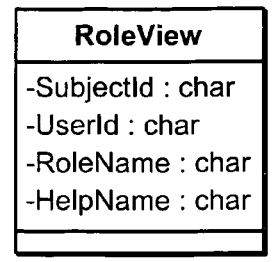
FIG. 6 is an illustrative drawing of a RoleView table, which is a database structure encoded in computer memory in accordance with some embodiments of the invention.

FIG. 6 is an illustrative drawing of a RoleView table, which is a database structure encoded in computer memory in accordance with some embodiments of the invention. It will be appreciated that, for example, most HR applications and many others contain relationship information between people and subjects that is available for use in producing RoleViews disclosed herein. Thus, the RoleViews can be produced from relationship information readily available in an application that is used with a system and method in accordance with the invention.

The SubjectId is the key in the database of an Entity or other key that the defines the Subject. The UserId is the key to a record in the database that defines the user. RoleName is a value that is the result of a query and a value in a Web_Role table. In some embodiments, a RoleView structure also provide a HelpName which is used to access a table of explanations in various languages so that users or administrators can have an explanation of the basis of the Role. If the HelpNames are kept unique for each RoleView and each sub-query within a RoleView, then the specific pattern that triggered a successful query can be identified.

A RoleView relation is a set of views stored in the database that implements the rules represented within a RoleView relation. Although it is not required that the RoleViews be stored in the database (they could come from a file), they must have structure. The RoleName recited in a given RoleView recites the role relationship between the userid and the subjectid recited in that given RoleView object. That is the one of the rules implemented through a role. The rest of the rules for a role are in other RoleViews associated with the SubjectName.

Since the RoleView has the full logic power of the database manager, any data present in the database can be used to define a role. This mechanism uses the principal that a rule in the form: If (conditions) then (result) can be mapped into a SQL statement of the form: Select (result) from tables where (conditions). While the some embodiments use a relational database to store and process rules the process could be implemented with any rule processing systems that supports forward and back chaining. However the storage of the rules inside a database manager generally provides better performance than a separate logic system since it reduces the number of interactions with the database system and allows the database system to optimize the query.

It will be appreciated that RoleViews are stored external to a PageContext. The PageContext is used to associate a SubjectName, which can be used to get the SubjectIdName and hence the SubjectId. The RoleViews are constructed into a single insert statement that significantly improves performance. The same mechanism can be used for workflow routing.

The following example illustrates a how a rule can be implemented as a SQL statement.
Rule:
If the person whose information is the subject of a page occupies a position that reports to a position occupied by the user, then the role of that association is 'DMgr'.

| SQL: |
|---|
| Select P.PersonId as UserId, PP.PersonId as SubjectId, character(4) 'DMgr' as RoleName, character(20) 'RoleEx_DMgr' as HelpName from Pers_Pos P join Pos_Pos P_P on P.PositionId = P_P.PositionId and PosPosRel = 'Manages' join Pers_Pos PP on P_P.ToPositionId = PP.PositionId and PP.PersPosRel = 'Occupies' where P.PersPosRel = 'Occupies'. |

In the above example, the UserId and the SubjectId in a RolesView relation of FIG. 6 are parameters of the SQL query, and the SQL query uses these parameters to produce a RolesViewResult. The RolesViewResult in this example is DMgr (i.e. Role=Direct manger), which means that the user with the UserId in the RoleView relation is the direct manager of the person associated with the SubjectId in that RoleView relation.

The following are two additional examples of Rule and SQL queries applicable to a RoleView table in accordance with embodiments of the invention.
Rule:
When a person accesses their own information then the role of that association is 'Self'.

| SQL: |
|---|
| Select P.PersonId as UserId, P.PersonId as SubjectId, character(8) 'Self' as RoleName, character(20) 'R_Self' as HelpName from Person P. Note: this query is true if and only if PersonId = UserId. |

Rule:
When the position that a person currently occupies has a salary grade that is identified as a Management or Executive grade then that person has the role 'Mgr' for anything they access.

| SQL: |
|---|
| SELECT pp.personid AS userid, pp.personid AS subjectid, 'Mgr'::bpchar::character(5) AS rolename, 'RoleEx_Manager'::bpchar::character(20) AS helpname FROM pers_pos pp JOIN position_desc pd ON pp.positionid = pd.positionid AND current_date between pd.effectivedate AND pd.enddate AND current_timestamp between pd.createts AND pd.endts JOIN salary_grade sg ON pd.grade = sg.grade AND (sg.mgmtclass = 'M'::bpchar OR sg.mgmtclass = 'E'::bpchar) WHERE current_date between pp.effectivedate AND pp.enddate AND current_timestamp between pp.createts AND pp.endts AND pp.persposrel = 'Occupies'::bpchar. |

In essence these queries examine a database for a set of conditions and return a coded (the RoleName) result.

Figure 7:
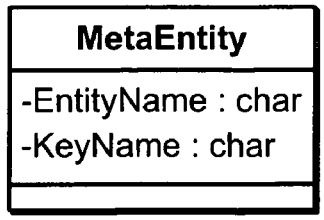
FIG. 7 is an illustrative drawing of a MetaEntitiy table that provides reference for the name of a key for each Subject and that is encoded in a computer readable medium in accordance with some embodiments of the invention.

FIG. 7 is an illustrative drawing of a MetaEntitiy table that provides reference for the name of a key for each Subject, that is encoded in a computer readable medium in accordance with some embodiments of the invention. The table MetaEntity (implemented as an XML data source in some embodiments) includes EntityName and KeyName. In the some embodiments the SubjectName is the same as EntityName. KeyName identifies the name of the key associated with the Subject.

A MetaEntity mechanism is used because typically there will be many pages with the same subject, i.e., Person. Whenever a page refers to the SubjecName Person, the system ordinarily must select the MetaEntity for that SubjectName and get the SubjectId name, i.e., PersonId in order to retrieve the value of the PersonId from the context of the transaction. Once the specific key that will be used as the SubjectId for access control has been found in the context, it is used as the SubjectId for the general process described herein. It will be appreciated, however, that using a table such as MetaEntity is one approach, and other approaches such as an Application Programming Interface that specifies the EntityName and KeyName can be used instead, for example.

Figure 8:
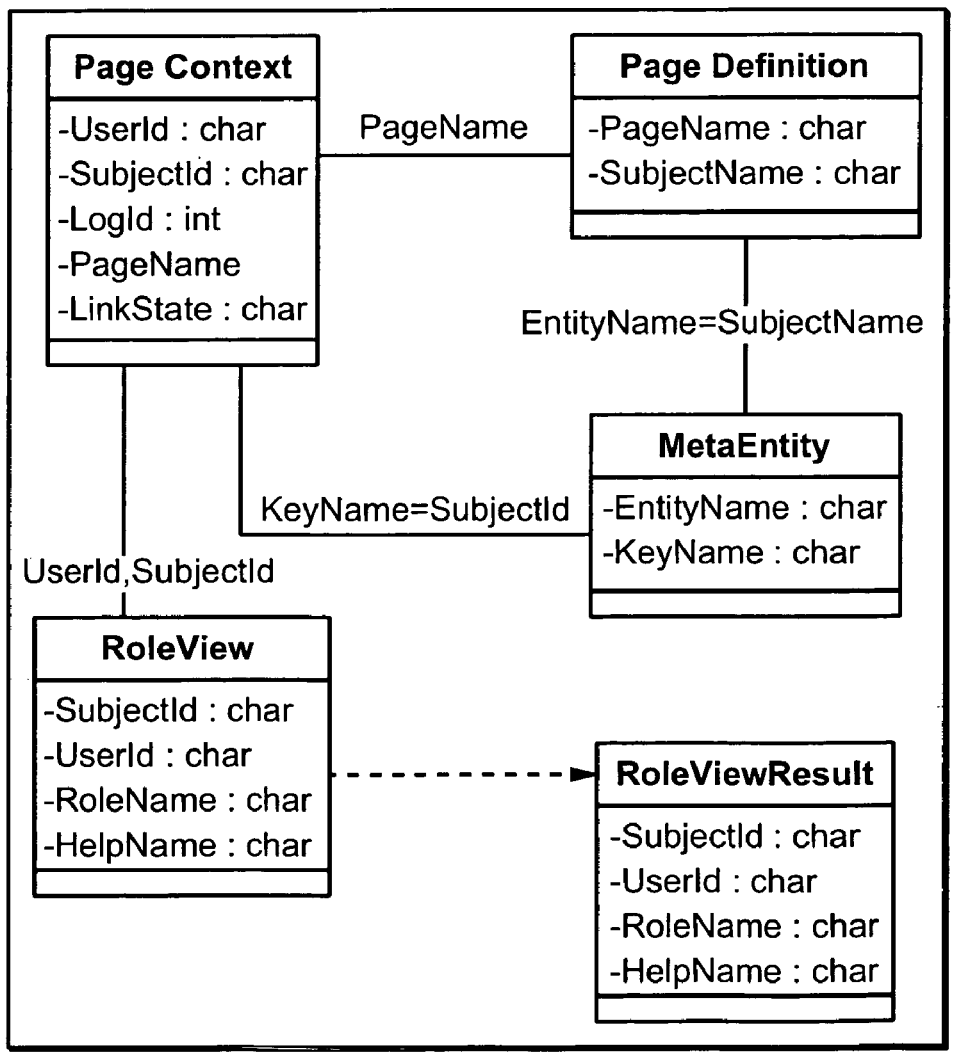
FIG. 8 is an illustrative drawing of a process to access RoleViews associated with a page context in accordance with some embodiments of the invention.

FIG. 8 is an illustrative drawing of a computer program process to access RoleViews associated with a PageContext in accordance with some embodiments of the invention. An application can search the PageContext for a value for KeyName. If such a value is found, all of the queries associated with a Subject in the SubjectViews table can be executed to derive all the roles associated with the Subject of the Page by iterating through the RoleViews or construction a union query comprising the set of RoleViews. Those RoleViews, when processed by the database system, will produce a set that contains the columns in the RoleViews. The PageDefinition contains the SubjectName, e.g. 'Person' which is used to access the MetaEntity which contains the KeyName of the specific subject, e.g. PersonId, which can be retrieved from the context and be used as the SubjectId. The SubjectId in combination with the UserId is used to retrieve the RoleViewResult using the RoleView. As explained above, The MetaEntity is used to find the name of the subject key. Otherwise it could be necessary to identify in the context what the SubjectId is in all the pages. By using a MetaEntity, a PageDefinition only has to identify the name of the subject, SubjectName, and the process can via the MetaEntity, retrieve the KeyName and access that value in the context which becomes the SubjectId value for the query.

Figure 9:
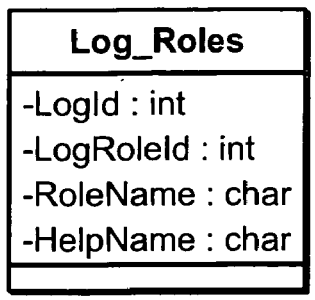
FIG. 9 is an illustrative drawing of a Log_Roles table that is stored in computer readable memory in accordance with some embodiments of the invention.

FIG. 9 is an illustrative drawing of a Log_Roles table that is stored in computer readable memory in accordance with some embodiments of the invention. Basically, a RoleViewResult is stored in a Log_Roles table associated with a key to the transaction such as LogId, to create a record of the roles at the point in time of the transaction. LogId is a unique value associated with a transaction that can be used to identify the User who was logged onto a session, as well as other information about the user and the transaction. LogRoleId is a unique generated value that is used to ensure that each record has a unique key. RoleName and HelpName are derived from the RoleView query.

Note that the prior Seeker Software did not write a Log_Roles table. Moreover, the RoleViewList of FIG. 5 is an intermediate step to writing the Log_Roles table. The Log_Roles table allows menus and other items to be role-based using SQL instead of programming. Seeker Software used SQL to determine the roles, but the roles were never store external to the process.

Figure 10:
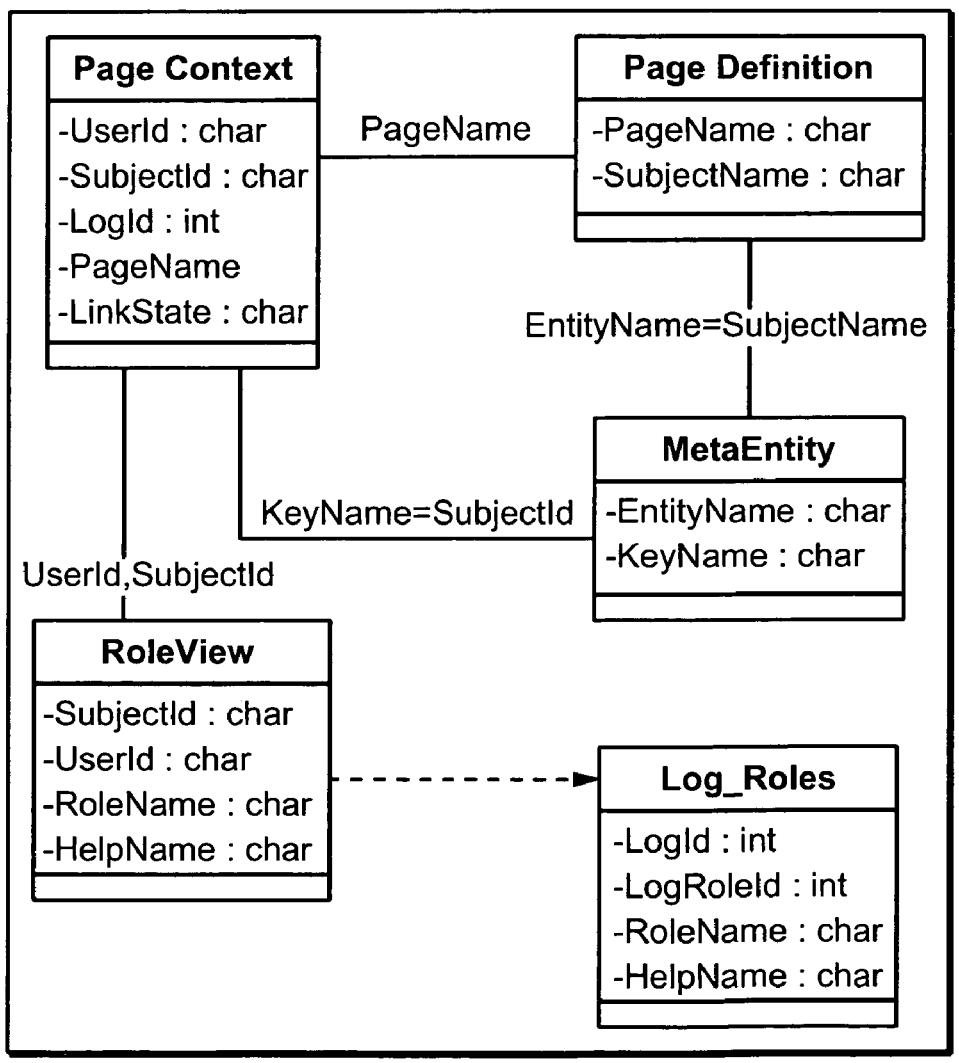
FIG. 10 is an illustrative drawing of a process to produce a Log_Roles table that is encoded in a computer readable medium in accordance with some embodiments of the invention.

FIG. 10 is an illustrative drawing of a computer program process to produce a Log_Roles table that is encoded in a computer readable medium in accordance with some embodiments of the invention. More particularly, in some embodiments, the Log_Roles table of FIG. 9 can be filled with a single SQL statement that forms a union of all the views in the Subject_View table.

Insert into log_roles
   (Select 71764, 1100.0 + random( )*100 , RoleName, HelpName from R_PersonDirectMgr where SubjectId = 1 and UserId = 1
   Union All
   Select 71764, 1200.0 + random( )*100 , RoleName, HelpName from R_PersonSelf where SubjectId = 1 and UserId = 1
   Union All
   Select 71764, 1300.0 + random( )*100 , RoleName, HelpName from R_PersonSeniorMgr where SubjectId = 1 and UserId = 1)

In many database systems the above query will operate using multiple processes where each of the select statements operates independently. Such a processing model reduces the total time required to retrieve the values for the query. While it is feasible to process each query in different processes if they are processed as separate rules embedded in a page process, that kind of parallel processing is significantly more difficult to develop and requires more resources for multiple connections to the database manager.

In an application server-database server environment, filling all the possible RoleName values with a single query that operates on the database server is more efficient than using separate queries. The ability to retrieve the Log_Roles after a Page has been accessed by a user is a feature of this process that enables auditing of online transaction access. This method generally is more reliable than a process that depends upon applications to write their access profiles to a log for later analysis. This is because the Log_Roles table is used to control access, so it is generally not possible for access to be allowed other than through a Log_Role entry that can be explained.

Generating or Validating PageNames

Figure 11:
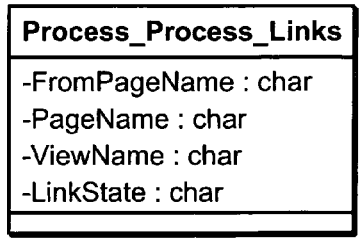
FIG. 11 is an illustrative drawing of a Process_Process_Links table is stored in the database in accordance with some embodiments of the invention.

FIG. 11 is an illustrative drawing of a Process_Process_Links table is stored in the database in accordance with some embodiments of the invention. The Process_Process_Links table can be used to develop a set of PageNames and ViewNames for Pages that are possible transitions from the current Page. The Process_Process_Links table is composed of rows that represent directed links between Pages. In the table Process_Process_Links, PageName is the identifier of a Page that might be accessed for the Subject. ViewName is a content identifier for data on the Page identified by PageName. FromPageName is the identifier for the current Page from which a transition is being considered. The FromPageName is a specific PageName or general code such as "Menu" meaning a menu on any page. LinkState is used in the workflow process below.

The illustrated Process_Process_Links table includes ViewNames, which serve as content identifiers that represent the possible sets of data for a specific Page. A single page may present more than one set of data. For example, a Page showing financial data might present data from the current year, the prior year, or projections for the following year. Each of the sets of data may have different access profiles. A manager might be able to see current and prior year data, but only an executive might have access to projected data. In the preferred embodiment, the content identifiers are ViewName variables since many of the content controls are database views. However, the content identifiers could be any identifier that the application can use to form a set of data.

Figure 12:
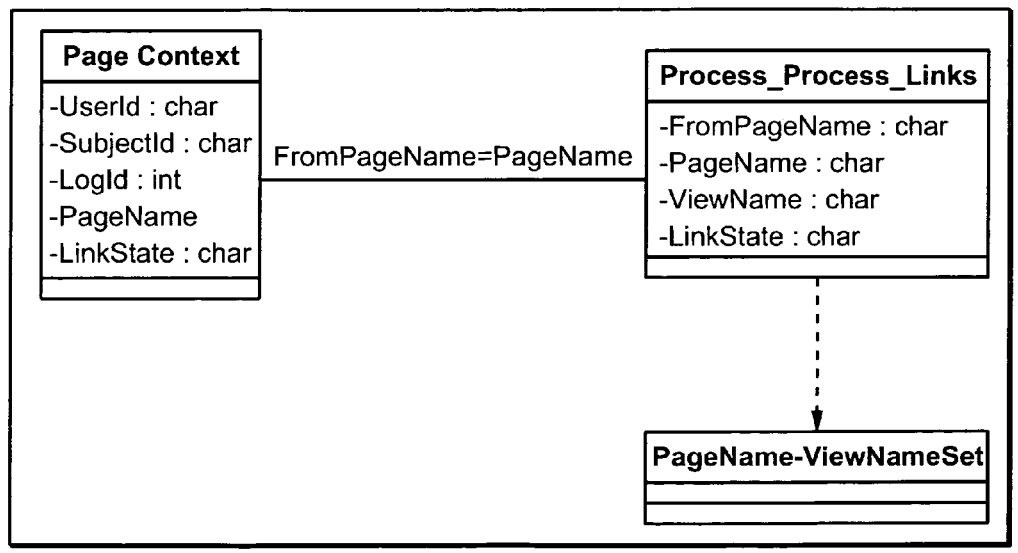
FIG. 12 is an illustrative drawing of a process to produce a PageName-ViewNameSet from a Page associated with the FromPageName of a Process_Process_Link table.

FIG. 12 is an illustrative drawing of a computer program process to produce a PageName-ViewNameSet from a Page associated with the FromPageName of a Process_Process_Link table. A PageName in a PageContext is used to associate a Process_Process_Link table that has a FromPageName that matches the PageName. A PageName-ViewNameSet in the Process_Process_Link table represents possible next page transitions from the FromPageName (i.e., from the PageName in the PageContext).

As explained more fully below with reference to FIGS. 13-15, there can be more than one (next) PageName for the FromPageName. That is one reason for a precedence value (described below)—so the system can decide which one to use. Once the PageName-ViewNameSet is developed in accordance with the process of FIG. 12, it is matched to the Web_Role table as described below to decide which.

Figure 13:
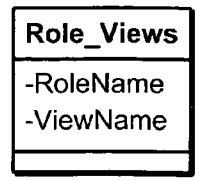
FIG. 13 is an illustrative drawing of a Role_Views table encoded in computer readable memory in accordance with some embodiments of the invention.

FIG. 13 is an illustrative drawing of a Role_Views table encoded in computer readable memory in accordance with some embodiments of the invention. The Role_Views table provides an association between RoleNames and ViewNames. The Role_Views table indicates, in effect that a User who has the relationship identified by the RoleName with a specific Subject is allowed access to the information represented by the ViewName.

It will be understood that the ViewName represents content. So RoleViews table signifies that a user with a particular role, say Direct Manager, can see certain data (i.e. content), say Compensation. If there is no ViewName for a RoleName, say Subordinate, then there is no access by such RoleName (i.e. subordinate) to the content corresponding to that ViewName. It is possible that the same page could display two different version of the data base on RoleName. for example, a Self role could see Compensation (a first ViewName), but not planned compensation changes (a second ViewName). Whereas, the Direct Manager or an Administrator could see current compensation (the first ViewName) and proposed changes to compensation (the second ViewName).

The approach in accordance with an aspect of the invention, of defining access control by associating content with the role rather than the Page has the advantage that a role that has access to many Pages does not have to have a reference defined for each Page, only for each form of the content. Also, when examining access for compliance with access policy, generally it is necessary only to examine the columns associated with a view rather than each Page. For example, if it were a company's policy that only the employee, the employee's manager, or an administrator were allow to view an employee's salary, an examination of the Role_Views table and the views associated with the roles would be adequate to determine compliance.

In some embodiments, database views are used to determine the columns from the database that are to be consider part of the content of a Page, however there are alternative schemes using other tables or page definitions.

Figure 14:
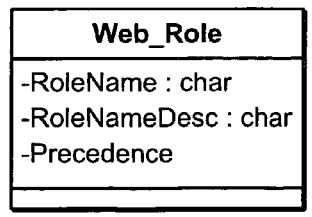
FIG. 14 is an illustrative drawing of a Web_Role table that can be stored in computer readable medium in accordance with some embodiments of the invention.

FIG. 14 is an illustrative drawing of a Web_Role table that can be stored in computer readable medium in accordance with some embodiments of the invention. RoleNames are defined in a database table, Web_Role, which provides a RoleNameDesc that is more meaningful when presented to a user, and also provides a Precedence value that can be used to decide which of several views should be used when making a transition. For example, if a user had two roles, HRAdmin and Mgr, and the HRAdmin had a lower Precedence, the user would be assigned the HRAdmin role. Likewise, if a user had a Mgr role and an Exec role the Exec role might be assigned a lower precedence value so that the system would choose the Exec role over the Mgr role if two different RoleViews are selected for SubjectName and SubjectId values.

If an application Page process has a list of possible next Pages, from a list of menus for example, it can match that list against the Process_Process_Links table to develop a list of PageNames and ViewNames—Result A. Alternately, the list of PageNames and ViewNames can be produced by selecting on FromPageName—Result A. That list of PageNames and ViewNames can then be matched against the Role_Views table to develop a list of PageNames, ViewNames, and RoleNames—Result B.

---

(e.g., Select ResultA.PageName, ResultA.ViewName, ResultB.RoleName
    from Process_Process_Links ResultA
Join Role_Views rv
    On rv.ViewName = ResultA.ViewName
where ResultA.PageName = 'somepagename')

---

Result B can then be matched against the Log_Roles table entries for the current transaction to develop a list containing only those PageNames, and ViewNames that are allowed for the roles the user has for the SubjectName and SubjectId—Result C. Matching Result B with Log_Roles achieves the reduction to the allowed PageNames and ViewNames because Log_Roles contains a list of all RoleNames. Where more than one ViewName is allowed for a PageName, Result C can be matched against the Web_Role table so that the ViewName and PageName associated with the RoleName having the lowest precedence can be selected. These intermediate results can be eliminated by a single query combining these results.

Thus, it will be appreciated that the Log_Role table includes the list of roles that apply to the current transaction and its context; its entries were developed in the first phase of this process. The Web_Role table defines what roles are valid in the system; and provides a precedence value.

Figure 15:
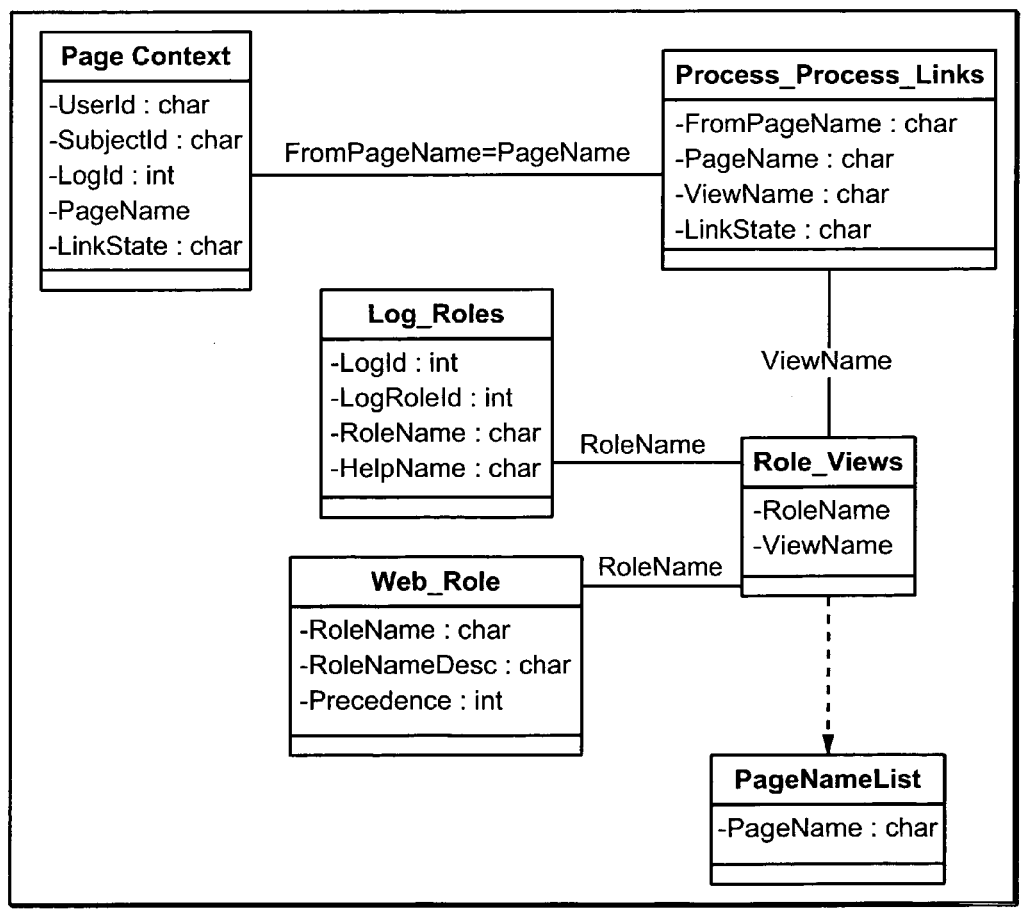
FIG. 15 is an illustrative drawing of a process in accordance with some embodiments of the invention to ascertain which pages a user may access.

FIG. 15 is an illustrative drawing of a computer program process in accordance with some embodiments of the invention to ascertain which pages a user may access. The following query is an example of how a list of allowed PageNames (i.e., PageNameList) can be developed using a single query from the Log_Roles table previously created.

---

Select PPL.PageName, PPL.ViewName,
    PPL.FromPageName, WR.Precedence
    from Process_Process_Links PPL
      join Role_Views RV
        on PPL.ViewName = RV.ViewName
      join Web_Role WR
        on RV.RoleName = WR.RoleName
      join Log_Roles LR
        on WR.RoleName = LR.RoleName
      where LR.LogId = 71788
      and PPL.FromPageName = 'WorkProfile'
      order by PageName, Precedence.

---

With PageName added to the 'where' clause of this query the query becomes one that validates the access to a Page. That is, if a page is transitioned to and the system is to validate that that transition is allowed for this UserId and the SubjectName and SubjectId combination, adding the current PageName to this query will allow that validation. Such validations can guard against spoofing attacks on the internet or detect program errors, for example.

The Generating or Validating PageNames process may be executed more than once for a Page process. More than one menu may appear on a Page or several hyperlinks may need to be independently verified. All of the generating processes can use the same Log_Roles entries and hence reuse that portion of the process.

It will be appreciated that in the illustrated embodiment of the invention, only three queries are used to resolve the PageNames and ViewNames for transition from page to page. The query of FIG. 5 retrieves the list of Subject Views associated with a Page. The query of FIG. 10 generates the Log_Roles based upon the specific User and SubjectId. The query of FIG. 15 develops the list of allowed pages. However, it will be appreciated that the principles of this aspect of the invention may be applied with a different number of queries.

Workflow Routing from Real-Time Relationships

Figure 16:
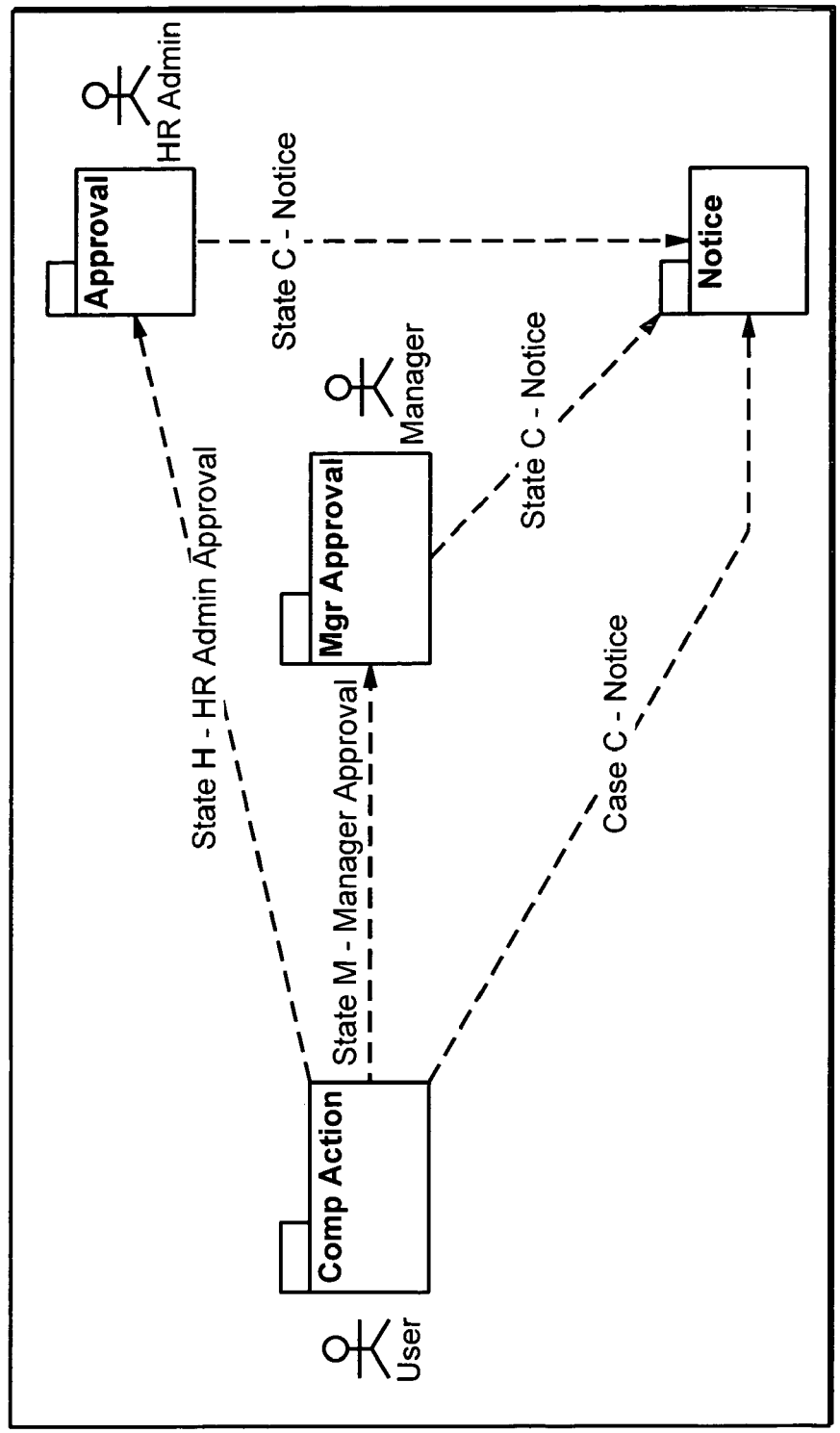
FIG. 16 is an illustrative drawing of workflow process in which work may flow among multiple Users.

An objective of a Workflow Routing process in accordance with some embodiments of the invention is to provide a list of UserIds and PageNames for the 'next' Page process. FIG. 16 is an illustrative drawing of a computer program workflow process among multiple Users depending upon end state of a Page at each stage of the flow. A workflow routing process can be used to determine the next Page and User in a process when more than a single Page is required to complete a transaction and the transaction is to be sent from one User to another or the process for a single user has alternative Pages, for example. A typical workflow is controlled based upon a Page terminating in one or more states; the terminating state of a Page determines the next stage of the workflow.

For example, referring to FIG. 16, a page that updates an employee's compensation (Page=Comp Action) might end in state 'M', state 'H', or state 'C'. In this illustrative example, if the Page ends in state 'M' then the change has been staged and must be approved by the User's manager before it can become final i.e., the workflow transitions to Page=MgrApproval. If the Comp Action Page ends in state 'H' then the transaction has been staged and must be approved by an HR Administrator before it can become final, i.e., the workflow transitions to Page=Approval. If the Comp Action Page ends in state 'C' then the transaction is complete notice should be sent to the employee, i.e., the workflow transitions to Page=Notice Referring to FIG. 11, in the embodiment disclosed herein, the Process_Process_Links table has a column, LinkState. A Page process might arrive at the state the workflow is in is in several ways, but the Workflow Routing process in accordance with some embodiments of the invention, begins when the state has been determined and the application wishes to determine the subsequent routing. A Page process, once it knows the workflow state, can select from the Process_Process_Link table the possible Pages to route to by specifying the LinkState and FromPageName.

Figure 17:
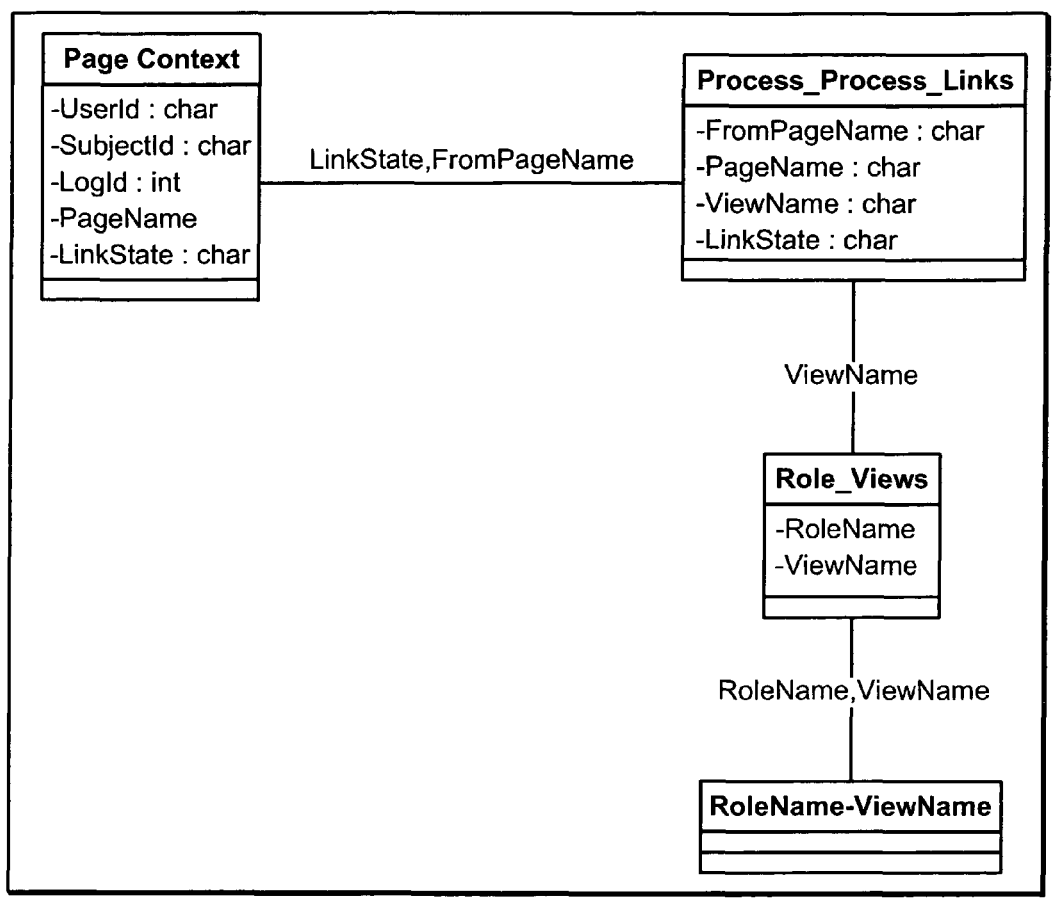
FIG. 17 is an illustrative drawing of a method to associate RoleName-ViewName relations with a PageContext.

FIG. 17 is an illustrative drawing of a computer program process to associate RoleName-ViewName relations with a PageContext. The Page Context provides the LinkState that is used to select the list of ViewNames from the Process_Process_Links table. These ViewNames are matched to the ViewNames in the Role_Views table providing a set of RoleName-ViewName pairs. The RoleName from this set of RoleName-ViewName pairs is used in the Routing Query below to provide one of the two selection attributes of the RoleView query.

The process of FIG. 17 can be implemented using the following query, for example:

```
select * from Process_Process_Links
    where LinkState = 'H' and FromPageName = 'WorkProfile'.
```

This query, Query A, provides a list of PageNames and ViewNames that have been designated to process the LinkState from the current page. A match of the ViewNames from this query to the Role_Views table provides a list of RoleNames that can access Pages with the set of ViewNames, Query B.

An aspect of the structure of the RoleView query is that it is reversible. Given any two of the columns the query will retrieve the third. In the Access Control method above, UserId and SubjectId were used to retrieve a list of RoleNames. Matching the RoleNames from Query B with the SubjectId of the Page under consideration produces a list of UserId's of people who have the authority to process the PageNames from the join of Query A and Query B. The following is the combination of Query A and Query B:

Routing Query:

```
Select R.UserId
    from process_Process_links PPL
    join Role_Views RV
        on PPL.ViewName = RV.ViewName
    join R_PersonDirectMgr R
        on RV.RoleName = R.RoleName
    where PPl.linkstate = 'NLoc'
        and PPL.frompagename = 'WorkProfile'
        and R.SubjectId = 1.
```

Figure 18:
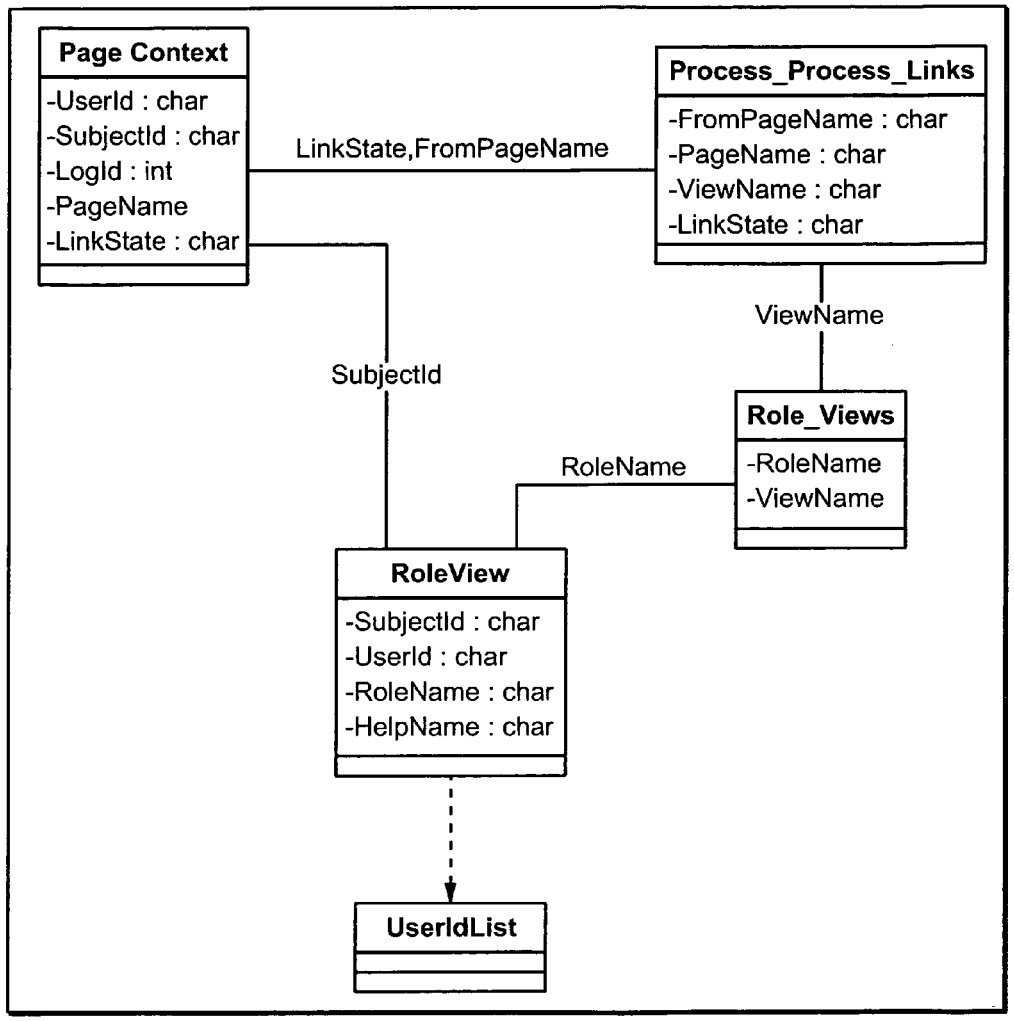
FIG. 18 is an illustrative drawing of a method of workflow process to associate next UserIds with a PageContext.

FIG. 18 is an illustrative drawing of a computer program process of associating next UserIds with a PageContext. The LinkState and FromPageName from the Page Context are used to select the candidate ViewNames from the Process_Process_Links table. The resultant ViewNames are used to select a set of RoleNames from the Role_Views table. That set of RoleNames combined with the SubjectId from the Page Context selects a UserId List from the RoleViews. This UserId list is the result that was desired from this process—a list of Users that are candidates for the 'next' page process. This list can be used to provide a selection list to the current User or to automatically route workflow.

It will be understood that the process of FIG. 17 produces an intermediate result, and that the process of FIG. 18 performs the process of FIG. 17 internally without the intermediate result.

It will be appreciated that the nature of the query represented by the process of FIG. 18 is that it prunes from the network those paths where there is no user that can satisfy the requirements of the role definition. In this way complex organizations where several possible roles can perform a function can be modeled. For example, if no one occupies the position to which someone reports, but someone does occupy the position above the missing manager's position, both of these positions might satisfy an approval workflow. If the Routing query retrieves only one row, that UserId is the only one that is authorized for the action. If it retrieves more than one row, a list can be presented to the user since any one of the UserIds can perform the action. If no UserIds are returned, there is no one who can perform the action.

Thus, in one aspect, a single mechanism, the RoleViews table operates for both access control and workflow routing. This eliminates the errors and inconsistencies of dual definitions. Moreover, workflows are automatically relative to the subject of an operation rather than relative to the performer of an action.

Time-Based Relationships

In modern applications, many operations are time-based—employees get raises as of a particular date, people work in projects and report time spent and when it is spent, and vendors are authorized to deliver material as of a specific date. This time-based nature of transaction applies to both access control and workflow routing. There are two ways time-based relationships are used in processes in accordance with some embodiments of the invention. The first way is to use the RoleView mechanism to define time-based roles. The second way is to have time-based role queries.

Time-Based Roles

In the case where some action is pending in the database that changes relationships and hence roles, it may be desirable to define a variation in the role to accommodate the differences. This is done by adding a time component to the RoleView query. An example of the need for this is the case where an employee is transferring from one manager to another. The role that the current manager has is Direct Manager. In the database there may be a pending transaction that changes the manager relationship from the current manager to the new manager. It is desirable for the current manager to have access to the employee's records until the change has been completed. It is also desirable for the new manager to have access to the employee's records to review information. To accomplish this, a new role, Proposed Manager is defined. A RoleView that queries the pending transaction defines that role. While the transfer transaction is pending, both roles will provide access to the employee's information.

Once a pending transaction is completed, two scenarios arise: (1) the action is effective as of the current date or some prior date, or (2) the action is effective in the future. In case (1), the non-time-based access control query allows access to the new manager and denies access to the old manager. But in case (2), shouldn't both managers have access until the transfer date. In case (2), a time-base RoleView query can provide access to both managers until only one is the "current" manager.

A by-product of this approach is that the routing role, Proposed Manager, appears in the routing list as soon as the pending transaction appears in the database. This immediate effect on the routing list is a highly desirable behavior. The immediate action on routing lists of a pending transaction is cumbersome in ACL-based systems.

Time-Based Role Queries

In time-based applications, the relationships between entities changes over time. If access to information is based on these relationships then access changes over time. This is the desired behavior. But what about looking back in time? If a person was an employee's manager last year, but someone else is now their manager should the first manager no longer have access to that person's records? A solution is to provide access to the employee's records on an 'as of' basis. That is, access should be allowed for queries that review the data prior the point in time that the employee was transferred. This can be accomplished in the access control and workflow routing mechanism by adding an 'as of date' to the RoleView query.

Figure 19:
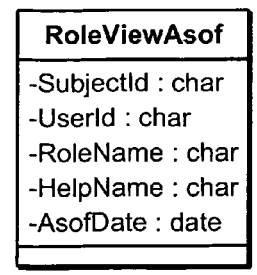
FIG. 19 is an illustrative drawing of a RoleViewAsof table that can be encoded in computer readable memory in accordance with some embodiments of the invention.

FIG. 19 is an illustrative drawing of a RoleViewAsof table that can be encoded in computer readable memory in accordance with some embodiments of the invention. This query adds the column AsofDate so that the query can qualify the relationships by a date. This column is required to be in the where clause and cannot be retrieved since it is used as a qualifier. An example of an as of query is:

```
Select P.PersonId as UserId, PP.PersonId as SubjectId,
   character(4) 'DMgr' as RoleName,
   character(20) 'RoleEx_DMgr' as HelpName,
   A.AsofDate
      from Asof A
         cross join Pers_Pos P
         join Pos_Pos P__P
            on P.PositionId = P__P.PositionId
               and PosPosRel = 'Manages'
               and A.AsofDate < P__P.EndDate
         join Pers_Pos PP
            on P__P.ToPositionId = PP.PositionId
               and PP.PersPosRel = 'Occupies'
         where P.PersPosRel = 'Occupies'.
```

Note: in this query the table Asof is a date pivot table containing one row for each date within a time period.

It will be appreciated that time-based queries can be applied to both access control and workflow routing in the same manner as the non-time-based queries in the earlier sections. As a result, access to information can be based not only on the current relationships between the user and the subject, but also on previous relationships. This capability would be virtually impossible with ACL schemes or embedded query models. Moreover, future or proposed access patterns and workflow routings can be supported through simple queries. Furthermore, since workflows often include transient roles like Proposed Manager, this scheme allows those future actions to be considered for workflow routings. Consequently, highly transient roles such as Proposed Manager can be supported without significant additional administrative burden. Also, transient roles such as the cases where an action is set with a future effective date and the current manager still has access automatically expire when the role is no longer current.

Updating Access and Workflow

New Subjects are added by inserting new rows in the Subject_Views table. The RoleViews are added to the database manager. The roles that the RoleViews define are added to the Web_Roles table where the Precedence value determines the priority. A row in the MetaEntity table is inserted identifying the EntityName as the SubjectName and providing the name of the key for the entity. At this point, Page Definitions can be created for the pages that have the subject as content. Since all the components of FIG. 8 are present, the system can begin to create rows in the Log_Roles table as the pages are processed.

Once a Subject is present in the Subject_Views table and the rest of the structure of FIG. 8 is present, new roles can be added by adding new RoleViews to the database and adding new rows in the Subject_Views table. As soon as the new rows appear in the Subject_Views table, page processors will use the new roles and rows will appear in the Log_Roles table.

Access to a new Page from a Page is accomplished by adding a new row in the Process_Process_Links table. This table must identify the application ViewName that will be used for the menu or hyperlink. If the ViewName has not been defined in the Role_Views table, new rows must be added for each role that has access to the ViewName. The structures of FIG. 15 having been completed, the process will begin to provide a PageNamesList.

Adding a new portion of a workflow is accomplished by adding a new row in the Process_Process_Links table that identifies the FromPageName and LinkState. If an application is extended in such a way that a new LinkState exists, then the workflow is updated by adding a new row in the Process_Process_Links table. In most cases the appropriate rows will already exist in the other tables of FIG. 18 and so the workflow process can immediately begin producing UserIdLists.

It will be appreciated that changes to application code are not required to add new Subjects, Roles, role definitions, or workflows steps. Moreover access control is simplified since examination of the data associated with a role is adequate to determine compliance with policy. Additionally, the process for changing access control or workflows can be progressive with visible feedback at each stage. Also, once a role has been defined for access control, it is easily reused for workflow routing.

Thus, the above-described embodiments of the present invention provide an improved approach to defining access control and workflow routing wherein definitions are stored in a database and access lists and workflow routings are developed by a series of database queries which may contain time-based variables.

Figure 20A:
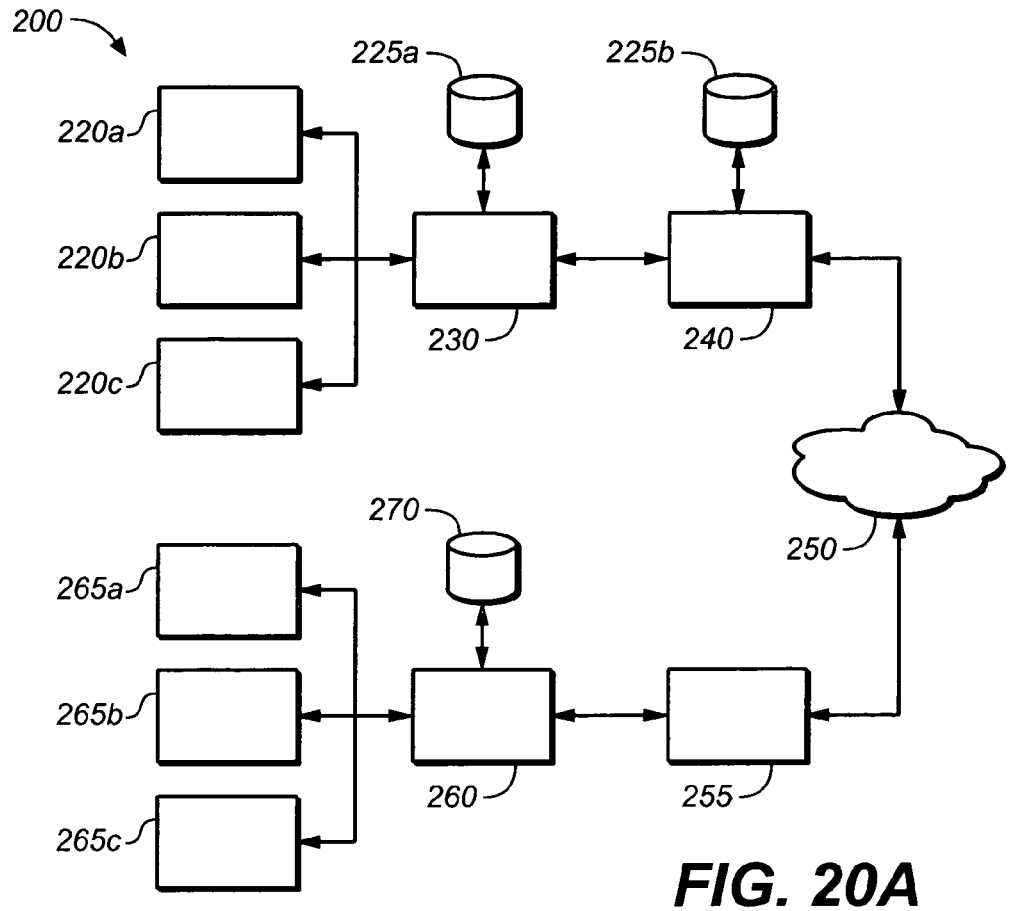
FIG. 20A, is an illustrative drawing of a system in which all of the above tables, queries and processes, or selections thereof, may be implemented.

Now turning to FIG. 20A, there is a system 200 in which all of the above methods, or selections thereof, may be implemented. System 200 comprises a plurality of computers 220a-c that may include user nodes, such as workstations, personal computers, or terminals connecting with a larger more centralized computer for processing capacity. Computers 220a-c may also include servers, such as racks of servers in a data room. An example computer 220a is described with respect to FIG. 20B. Computers 220a-c may connect to a Local Area Network (LAN), by for example, connecting with a switch 230. The LAN may be implemented with copper connections, fiber, or wirelessly, and may operate at any of a variety of speeds, for example the LAN may be a copper gigabit Ethernet network. Computers 220a-c may have multiple network connections.

Switch 230 may also connect with a Network Attached Storage (NAS) 225a that may store information including design specifications, cell libraries, simulator code, and the like. NAS 225a may be accessible by computers 220a-c. Switch 230 in turn communicates with a router 240 that may connect over a private network or dedicated link to storage medium 225b. Router 240 connects over a Wide Area Network, including using the Internet, and various types of private networks, or leased lines, to a router 255 for a second local area network that includes switch 260 which connects with a NAS 770. Switch 260 networks computers 265a-c which may also include user interface points as well as servers able to accept jobs for processing.

Figure 20B:
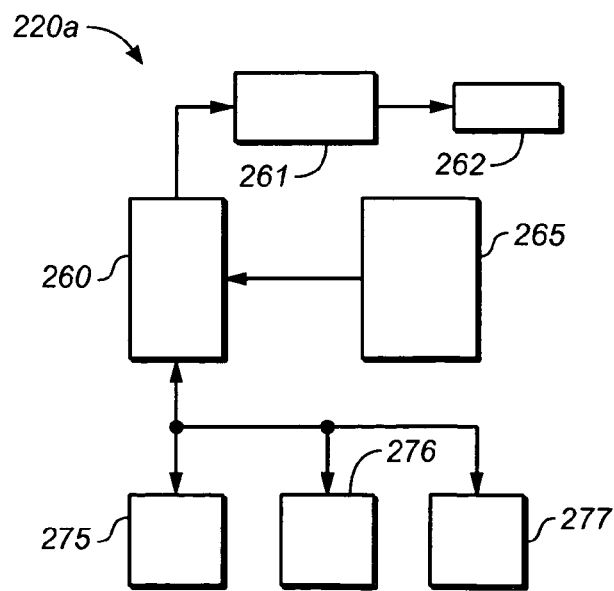
FIG. 20B is an illustrative drawing of computer of the system of FIG. 20A.

FIG. 20B illustrates an example computer 220a that includes a central processing unit (CPU) 260 communicating with storage 275, network port 276, and I/O 277. User interface 265 may comprise keyboards, mice, voice recognition and other interfaces. The CPU outputs data for display through display controller 261 to display 262.

The foregoing description and drawings of preferred embodiment in accordance with the present invention are merely illustrative of the principles of this invention, and that various modifications can be made by those skilled in the art without departing from the scope and spirit of the invention.

The invention claimed is:

1. A computer-implemented method of identifying a role relationship associated with a user viewing a current page in an interactive application and a candidate set of information that is accessible by the user, the method comprising:

identifying, using a computer processor, a user identification and a subject identification from a page context associated with the current page, wherein the user identification is a database key that identifies the user viewing the current page, and wherein the subject identification is a database key that identifies the candidate set of information that is accessible by the user, the set of information regarding an entity, and wherein a subject name identifies the type of information of the candidate set of information;

identifying, using the computer processor, a page name from the page context, wherein the page name identifies the current page;

determining the role relationship associated with the subject identification and the user identification using a set of role views, which are database views, stored in a database external to the page context, and wherein the role relationship specifies a role played by the user with respect to the entity; and storing the role relationship in a log roles table, wherein the log roles table is a database table that is stored external to the page context.

2. The method of claim 1, further comprising:

identifying the subject name using the page name to access a page definition table, which is a database table; and identifying one or more role view names using the subject name to access a subject views table, which is a database table, wherein each role view name identifies a role view.

3. The method of claim 1, wherein the role views are implemented in Structured Query Language (SQL).

4. The method of claim 1, wherein storing the role relationship in the log roles table further comprises storing a log identification associated with the role relationship, wherein the log identification is a transaction identifier obtained from the page context.

5. A computer-readable storage medium having computer-executable instructions for identifying a role relationship associated with a user viewing a current page in an interactive application and a candidate set of information that is accessible by the user, comprising instructions for:

identifying a user identification and a subject identification from a page context associated with the current page, wherein the user identification is a database key that identifies the user viewing the current page, and wherein the subject identification is a database key identifies the candidate set of information that is accessible by the user, the set of information regarding an entity, and wherein a subject name identifies the type of information of the candidate set of information;

identifying a page name from the page context, wherein the page name identifies the current page;

using a set of role views, which are database views, stored in a database external to the page context to determine the role relationship associated with the subject identification and the user identification, and wherein the role relationship specifies a role played by the user with respect to the entity; and storing the role relationship in a log roles table, wherein the log roles table is a database table that is stored external to the page context.

6. The computer-readable storage medium of claim 5, further comprising instructions for:

identifying the subject name using the page name to access a page definition table, which is a database table; and identifying one or more role view names using the subject name to access a subject views table, which is a database table, wherein each role view name identifies a role view.

7. The computer-readable storage medium of claim 5, wherein the role views are implemented in Structured Query Language (SQL).

8. The computer-readable storage medium of claim 5, wherein storing the role relationship in the log roles table further comprises storing a log identification associated with the role relationship, wherein the log identification is a transaction identifier obtained from the page context.

* * * * *